United States Patent [19]

Brown

[11] Patent Number: 4,817,043

[45] Date of Patent: Mar. 28, 1989

[54] INFORMATION KIOSK

[76] Inventor: Johnny M. Brown, 806 5th St., Coralville, Iowa 52241

[21] Appl. No.: 213,026

[22] Filed: Jun. 28, 1988

[51] Int. Cl.⁴ .............................................. G06F 15/66
[52] U.S. Cl. ..................................... 364/518; 346/154
[58] Field of Search ............................... 364/518–523; 358/300–302, 345, 347, 903; 346/160, 107 R, 108, 154; 340/795–796, 809, 716

[56] References Cited

U.S. PATENT DOCUMENTS

| | | | |
|---|---|---|---|
| 3,637,934 | 6/1972 | Brewstor | 358/301 |
| 4,745,560 | 5/1988 | Pecker et al. | 364/519 |
| 4,764,880 | 8/1988 | Pearl | 364/519 |

Primary Examiner—Arthur G. Evans
Attorney, Agent, or Firm—Allan L. Harms

[57] ABSTRACT

An information kiosk is disclosed which provides interactive operation with an unfamiliar user. A video display provides instructions and solicited information to the user who enters choices on a keypad input device. The kiosk provides printed information which the user may carry away from the kiosk. Graphic as well as textual information is dispensed by the kiosk.

20 Claims, 2 Drawing Sheets

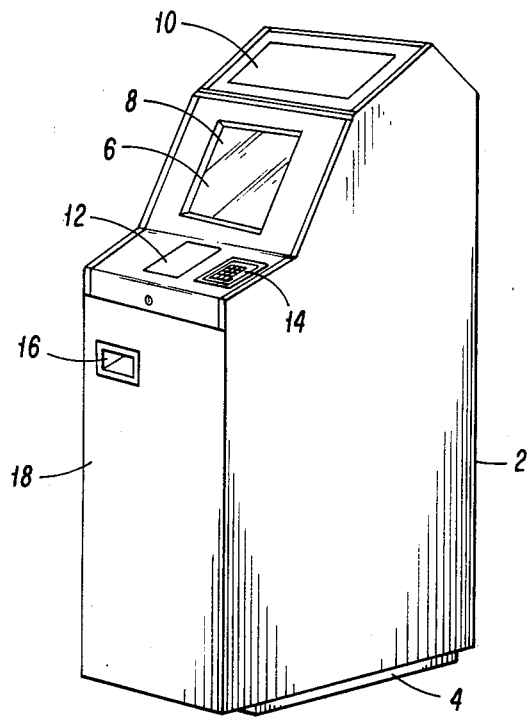
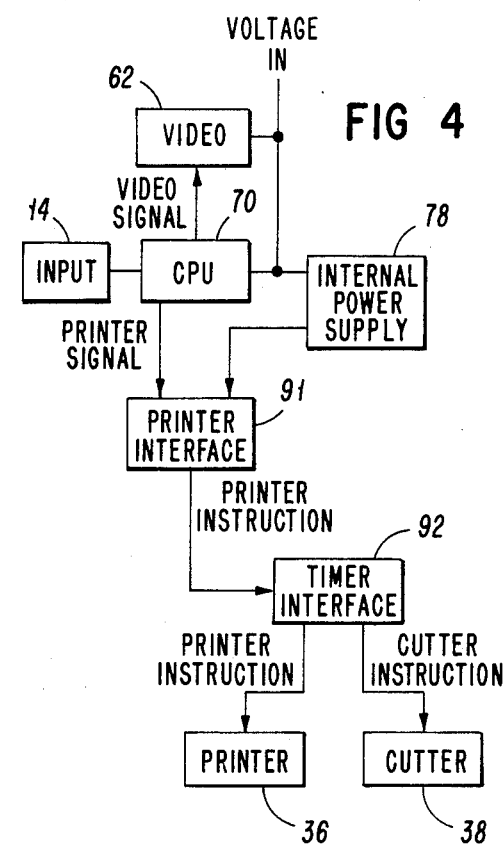
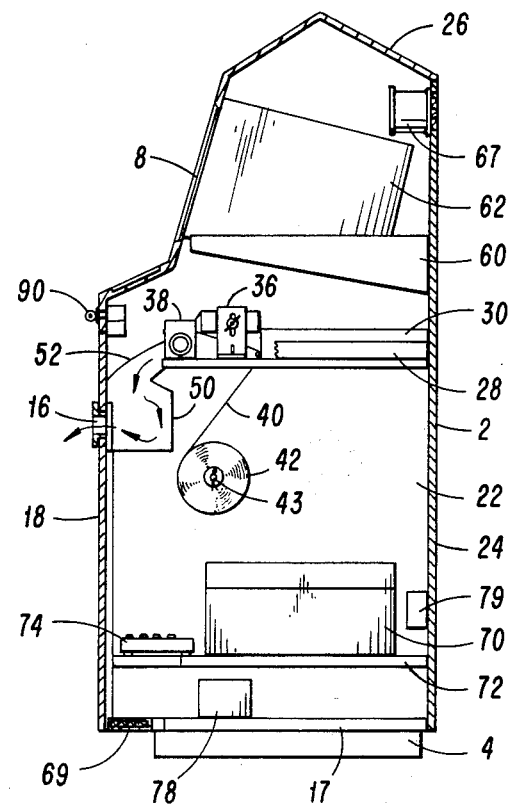

INFORMATION KIOSK

BACKGROUND OF THE INVENTION

It is common practice for shopping malls, hospitals and other large facilities to provide directories and signage to inform visitors of the location of stores, departments, etc. in the facilities. These directories are commonly stationed in common areas, on a kiosk or other selfcontained sign holder. Recently, information directories have been developing which are user interactive, that is, the user may choose from a list of alternatives and the display device provides further information relating to the choices made by the user. Existing devices provide a temporary visual display of the information but no tangible output.

SUMMARY OF THE INVENTION

This invention relates to information display devices and more particularly to information display kiosks which provide interaction with the user.

A housing is provided which houses a video display device, a small computer, a user input device such as a keyboard or keypad, a printer device and a supply of paper upon which printing may be accomplished. Openings are provided in the housing to provide visual access to the video display device screen and for passage of printed material from the housed printing device to the user. Shelving within the housing provides support for the housed components. Central distribution of electricity to the housing is provided. Security mounting and locks are provided to prevent unauthorized entry into the housing. Air circulation is provided among the components for heat control.

One object of the invention is to provide an information display device which may be operated by an inexperienced user.

Another object of the invention is to provide an interactive display device which provides a tangible output to the user specific to the information chosen by the user to be displayed.

Another object of the invention is to provide an interactive information display system with secured access to the components thereof.

Another object of the invention is to provide a user manipulated information display kiosk which may be conveniently altered to meet changes in the information to be displayed.

These and other objects will be apparent from the detailed description which follows.

DESCRIPTION OF THE DRAWING FIGURES

FIG. 1 is a perspective view of the invention.

FIG. 2 is a side view in section of the invention.

FIG. 4 is a block diagram of the electrical interrelation of the internal components of the invention.

DETAILED DESCRIPTION OF THE INVENTION

Figure 3:
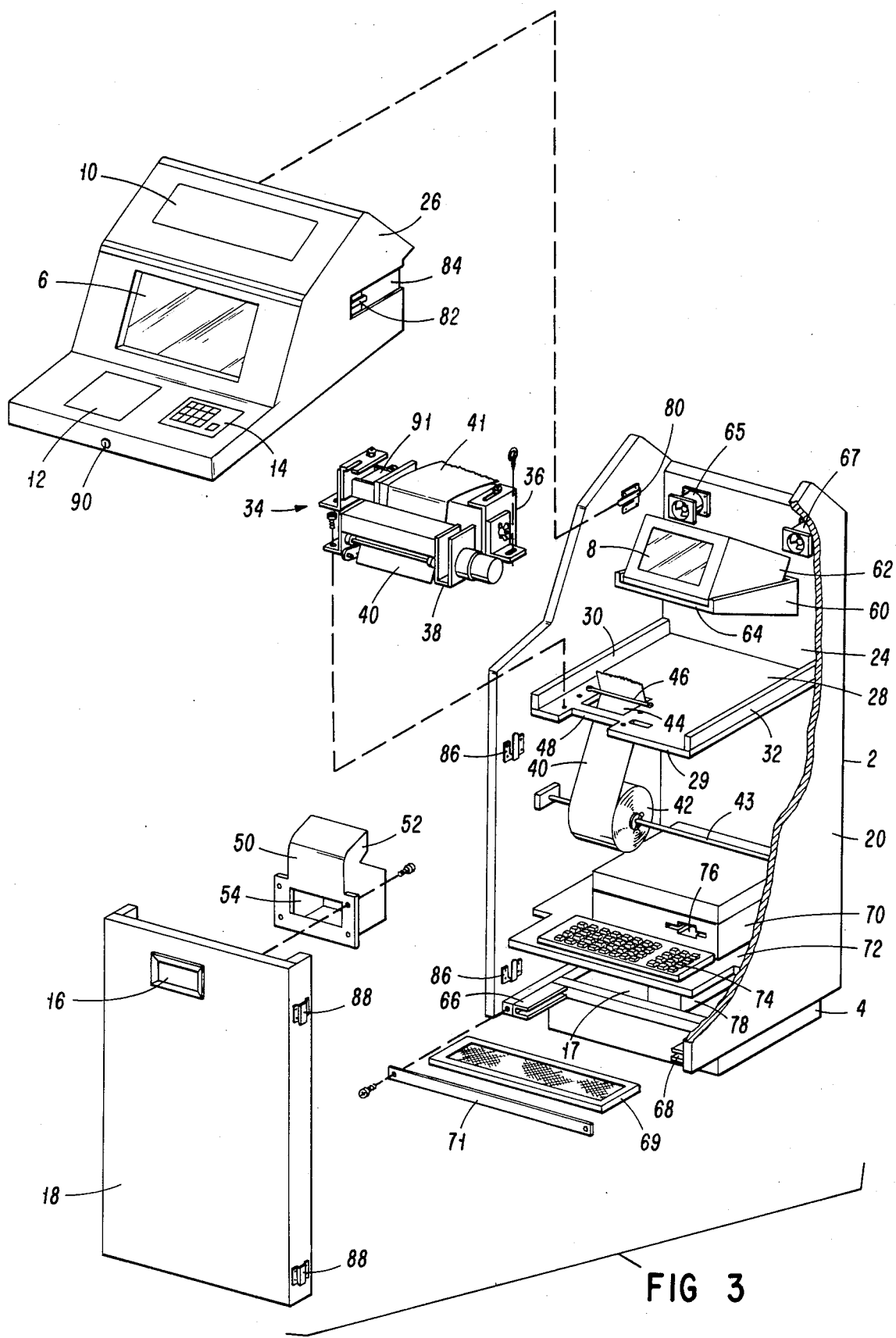
FIG. 3 is a partially exploded view in perspective, with a sidewall partly cut away, of the components of the invention.

Referring now to the drawings, FIG. 1 depicts the invention in perspective. Housing 2 rests upon base 4 and is provided with window 6 through which display screen 8 may be viewed. Cards 10 and 12 are secured to housing 2. User input device 14 is mounted upon housing 2 where it may be accessed by the intended user. Printout opening 16 is also provided within housing 2. In the preferred embodiment, printout opening 16 is provided in front wall 18 of housing 2 though it should be understood that other placement of printout opening 16 may be used.

Referring to FIGS. 2 and 3, the invention can be seen in more detail. Housing 2 is comprised of front wall 18, sidewalls 20 and 22, rear wall 24 and cover 26. It is to be understood that though a rectangular polygon is utilized in the preferred embodiment, other configurations of housing 2 are contemplated, including for example, columnar. Sidewalls 20 and 22 support first shelf 28 including brackets 30 and 32. Printer assembly 34 mounts to first shelf 28 near the front edge 29 thereof. Printer assembly 34 includes printer interface 91, printer 36, and cutter mechanism 38. Paper 40 upon which printing is accomplished by printer 36 is routed from paper supply 42 through access 44 behind guide 46 and into printer 36. After printing is completed, paper 40 is fed into cutter mechanism 38 where the paper upon which printing has been accomplished is selectively severed from the paper stream 41 feeding the printer 36.

In the preferred embodiment, printer 36 is a thermal dot matrix printer of well known type which is chosen due to its low noise characteristics but it must be remembered that other types of printers may be used provided such printers are capable of printing graphic output.

Recess 48 is provided in first shelf 28 to allow receptacle 50 to rest under cutter mechanism 38 whereby severed printouts will fall from cutter mechanism 38 into input sleeve 52 of receptacle 50. Receptacle 50 mounts to front wall 18 of housing 2 such that printout opening 16 of front wall 18 communicates with passageway 54 of receptacle 50. Arrows shown in FIG. 2 illustrate the path of severed paper from cutter mechanism 38 to printout opening 16.

Tray 60 depends from rear wall 24 and supports video display device 62. In the preferred embodiment, tray 60 is provided with floor 64 which is angled from the horizontal in order to provide comfortable viewing of information appearing on video display screen 8 of video display device 62. In the preferred embodiment, a cathode ray tube type monitor is used as the video display device 62. Other display devices such as liquid crystal diode or gas plasma displays are contemplated for use, as alternatives. Fans 65 and 67 are mounted to rear wall 24 and draw air from within housing 2 causing circulation among the internal components of the invention. Air filter 69 is positioned between rails 66 and 68 for passage of intake air therethrough. Retainer 71 retains filter 69 in place. Retainer 71 may be selectively removed for interchange of filter 69 without allowing access to the components within housing 2.

Paper supply 42 is supported on rod 43. Because a thermal type printer 36 is used in the preferred embodiment, appropriate thermally reactive paper must be used. Because this type of paper is conveniently available in roll form, a support such as rod 43 is desirable in the preferred embodiment. Other means of supporting a paper supply are contemplated, such as will a support shelf or bin.

Central processing unit 70 is provided on second shelf 72. Secondary input device 74 also is supported on second shelf 72. Secondary input device 74 is a computer style keyboard in the preferred embodiment. Central processing unit 70 is provided with floppy diskette receiving opening 76. Central processing unit 70 must be a computer which is capable of generating graphic video display output signals as well as graphic printed output display signals. In the preferred embodiment, a Commodore ™ Amiga ™ computer is used though other brands of microcomputers which will display and print graphic representations may be utilized. Commodore ™ and Amiga ™ are trademarks of Commodore Business Machines Incorporated.

An internal power supply 78 for the kiosk invention is mounted upon floor 17. Base 4 supports housing 2. Power distribution panel 79 mounts to rear wall 24.

Latches 80 are paired on the insides of sidewalls 20 and 22 and mate with sliders 82 on each side of cover 26. Channels 84 of cover 26 allow horizontal movement of cover 26 relative to frontwall 18. Catches 86 mate the strikers (not visible in FIG. 3) such as strikers 88 of frontwall 18. Key lock 90 of cover 26 controls access to the interior of housing 2. When key lock 90 is released, cover 26 may be slid forward disengaging the mating of latches 80 and sliders 82 and then removed. With cover 26 removed, frontwall 18 may be raised so that catches 86 will disengage strikers corresponding to strikers 88 and frontwall 18 may be then removed. No other access to the interior of housing 2 is available.

Cover 26 is provided with window 6 through which video display screen 8 may be viewed. User input device 14 is mounted to cover 26 positioned such that a user may operate the user input device 14 while viewing video display screen 8. In the preferred embodiment, user input device 14 is a key pad but other input devices such as touch pads, light pens or the like are contemplated.

Instructional matter or other printed matter is provided at cards 10 and 12 fixed to cover 26.

Cover 26 is shaped in a pleasing yet functional manner without horizontal surfaces upon which objects may be placed. This shape prevents the deposit of drink cups and the like upon the device thereby reducing the likelihood of accidental spillage onto the user input device 14.

FIG. 4 discloses the block wiring diagram of the electronic components of the invention. Line voltage is distributed to video display device 62, to central processing unit 70 and to internal power supply 78. Printer interface 91 receives electrical power from internal power supply 78 and distributes power to printer 36 and cutter mechanism 38 through timer interface 92. Timer interface 92 receives instructions from printer 36 and delivers timing signals for cutting to cutter mechanism 38. Input signals from user input device 14 stimulate central processing unit 70 to compute and to deliver signals for display instructions to video display device 62 and printing instructions to printer 36 through interfaces 91 and 92.

OPERATION OF THE INVENTION

An untrained user wishing to obtain information from the invention is provided operating instructions on display screen 8 and optionally on either or both cards 10 and 12. The user may be asked whether he or she wishes information about a topic, or a diagram of how to find a location in a facility, a department in a hospital, for instance. The user keys the choices made upon user input device 14 resulting in output to display screen 8 of video display device 62. The user may then select different video information or may request a printed output, such as a map of the facility, by choosing proper input choices on the user input device 14. Central processing unit 70 computes the information and directs the printer 36 to imprint paper 40 with the desired information and to sever the printed output from the paper stream 40 at cutter mechnism 38. The printout is then available to pass into receptacle 50 where it may be retrieved through printout opening 16. The user may then carry away the printout and use its information, for example, as a map to find a desired facility location.

Having described the invention, I claim:

1. Interactive apparatus to provide information to a user, the invention comprising:
    a housing having a window therein, said housing containing a central processing unit, a visual display and a printing device,
    said central processing unit capable of generating output signals to display graphic images,
    said visual display operatively interconnected with said central processing unit,
    said visual display being viewable by a user through said window of said housing,
    an input device mounted upon said housing and operatively interconnected to said central processing unit,
    said input device capable of being operated by a user,
    said printing device operatively interconnected to said central processing unit,
    said printing device capable of printing a graphic image from signals from said central processing unit,
    a supply of paper provided to said printing device to receive print thereon,
    said housing having an opening therein for passage of said paper from said printer,
    whereby said user may operate said input device to respond to information displayed on said visual display and to cause the central processing unit to cause said pinter to print out information selected by said user.
2. The invention of claim 1 wherein
    a cutting device selectively positioned to said printing device and interactively connected thereto to receive paper printed upon by said printing device and to sever said print bearing paper from said paper supply,
    a passageway to receive said severed print bearing paper,
    said opening communicating with said passageway.
3. The invention of claim 1 wherein
    said housing comprises a cover and a surround,
    said surround comprises a front wall and sidewalls,
    said front wall is fastened to said sidewalls by a plurality of mating fasteners.
    said fasteners of said front wall mate to said fasteners of said sidewalls only by substantially vertical movement,
    said cover mounts to said surround by generally laterally mating fasteners,
    said cover prevents vertical movement between said front wall and said sidewalls,
    said cover includes lock means which selectively prevent lateral movement of said cover relative to said surround,
    said window and said input devices are mounted to said cover,
    said cover having no substantially horizontal surfaces thereon.
4. The invention of claim 1 wherein said printer is a thermal dot matrix printer,
said supply of paper is thermally reactive paper.

5. The invention of claim 1 wherein
said input device is a ten key keypad.

6. The invention of claim 5 wherein
said keypad is a pressure sensitive keypad.

7. The invention of claim 1 wherein
said input device is a touch pad.

8. The invention of claim 1 wherein
said video display is a cathode ray tube.

9. The invention of claim 8 wherein
said cathode ray tube is capable of producing color graphic images.

10. The invention of claim 1 wherein
said video display is a gas plasma display.

11. The invention of claim 1 wherein
said video display is a liquid crystal display.

12. An information kiosk of the type having a changeable video display and means for user input thereto, the invention comprising:
- a housing having a window therein, said housing containing a central processing unit, a visual display and a printing device,
- said central processing unit capable of generating output signals to display graphic images,
- said visual display operatively interconnected with said central processing unit,
- said visual display being viewable by a user through said window of said housing,
- an input device mounted upon said housing and operatively interconnected to said central processing unit,
- said input device capable of being operated by a user,
- said printing device operatively interconnected to said central processing unit,
- said printing device capable of printing a graphic image from signals from said central processing unit,
- a supply of paper provided to said printing device to receive print thereon,
- a cutting device selectively positioned to said printing device and interactively connected thereto to receive paper printed upon by said printing device and to sever said print bearing paper from said paper supply,
- a passageway to receive said severed print bearing paper,
- said housing having an opening therein,
- said opening communicating with said passageway,
- whereby said user may operate said input device to respond to information displayed on said visual display causing said central processing unit to cause said printer to print out information selected by said user.

13. The invention of claim 1 wherein
said printer is a thermal dot matrix printer,
said supply of paper is thermally reactive paper.

14. The invention of claim 13 wherein
said input device is a ten key keypad.

15. The invention of claim 13 wherein
said cathode ray tube is capable of producing color graphic images.

16. The invention of claim 13 wherein
said input device is a ten key keypad,
said cathode ray tube is capable of producing color graphic images.

17. Apparatus for use by a visitor to a facility to obtain printed directory information for said facility by interaction therewith, the invention comprising:
- a housing having a window therein, said housing containing a central processing unit, a visual display and a printing device,
- said central processing unit capable of generating output signals to display graphic images,
- said visual display operatively interconnected with said central processing unit,
- said visual display being viewable by a user through said window of said housing,
- an input device mounted upon said housing and operatively interconnected to said central processing unit,
- said input device capable of being operated by a user,
- said printing device operatively interconnected to said central processing unit,
- said printing device capable of printing a graphic image from signals from said central processing unit,
- a supply of paper provided to said printing device to receive print therein,
- a cutting device selectively positioned to said printing device and interactively connected thereto to receive paper printed upon by said printing device and to sever said print bearing paper from said paper supply,
- a passageway to receive said severed print bearing paper,
- said housing having an opening therein,
- said opening communicating with said passageway.

18. The invention of claim 17 wherein
said printer is a thermal dot matrix printer,
said supply of paper is thermally reactive paper.

19. The invention of claim 17 wherein
said input device is a ten key keypad.

20. The invention of claim 17 wherein
said video display is a cathode ray tube,
said cathode ray tube is capable of producing color graphic images.

* * * * *